Figure 1:
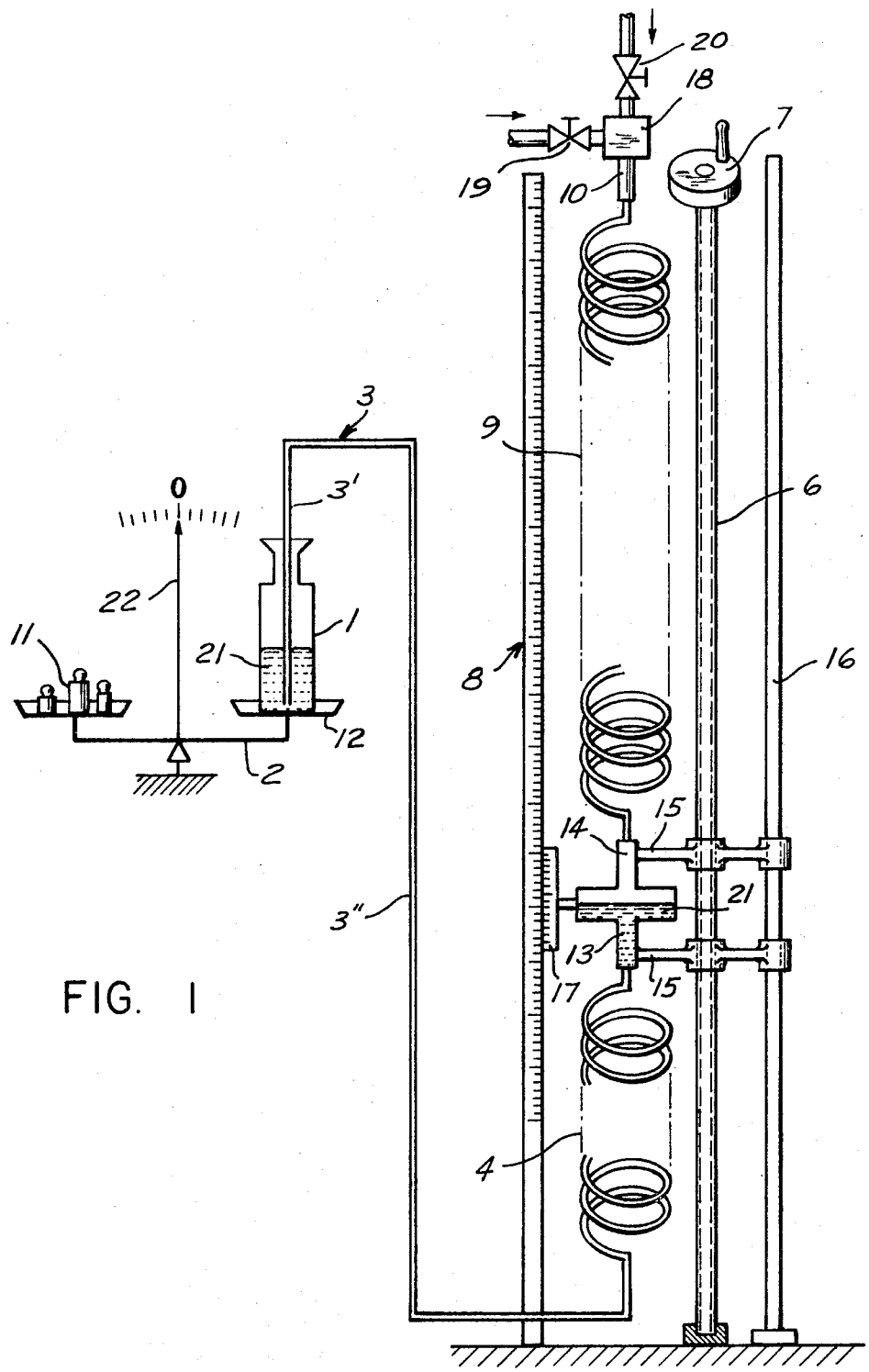

United States Patent

Chadenson

[15] 3,667,298
[45] June 6, 1972

[54] MERCURY MANOMETER
[72] Inventor: Pierre Chadenson, La Tronche, France
[73] Assignee: Societe Generale De Constructions Electriques Et Mecaniques (Alsthom), Grenoble, France
[22] Filed: Nov. 9, 1970
[21] Appl. No.: 87,855

[30] Foreign Application Priority Data

Nov. 13, 1969 France..................................6939387
July 16, 1970 France..................................7027329

[52] U.S. Cl. ............................................73/405, 73/401
[51] Int. Cl. ...................................................G01l 7/18
[58] Field of Search ...........................73/401, 405, 296

[56] References Cited

UNITED STATES PATENTS 3,515,005   6/1970   Brown .....................................73/405

*Primary Examiner*—Donald O. Woodiel
*Attorney*—Sylvester J. Liddy, John J. Hart, Joe E. Daniels and Charles E. Baxley

[57] ABSTRACT

The high precision mercury manometer disclosed herein comprises a container exposed to atmospheric pressure and seated on one of the trays of a balance. Inserted into the container is a vertical portion of a rigid pipe which is coupled at its other end by a flexible connector, to the bottom of a second container exposed either to atmospheric pressure, or to a second pressure to be measured. The second container is displaceable vertically over the length of a scale graduated both above and below the level of the first container. The connection between the two containers constituted of the rigid and flexible conduits has a practically constant volume, irrespective of the change in location of the second container. The first container and the balance may be sealed in a closed chamber which may be exposed either to atmospheric pressure, or to a third pressure between which and the second pressure a differential pressure reading is desired. A connection is provided between the closed chamber and the second container so that the mercury level in the latter may also be subjected to the third pressure.

8 Claims, 2 Drawing Figures

INVENTOR.
PIERRE CHADENSON

MERCURY MANOMETER

THE INVENTION

This invention relates to mercury filled manometers and is primarily concerned with the provision of an improved mercury filled monometer capable of measuring with high precision pressures differing from that of the atmosphere and especially low pressure or partial vacuums.

In accordance with the invention, the manometer essentially includes a container seated on one of the trays of a balance and one vertically disposed end of a rigid pipe extending down into a supply of liquid mercury contained therein. The rigid pipe is coupled by a conduit, at least part of which is flexible, to the bottom of a second container which also contains liquid mercury and which may be displaced vertically along a graduated scale extending above and below the level of the mercury in the first container. This arrangement of the two containers, the rigid pipe and the connecting conduit will provide a practically constant volume of mercury between the levels in the two containers irrespective of the deformation caused in the connecting conduit by changes in level of the mercury in the second container.

The aforesaid essential construction may be utilized to measure a low pressure or partial vacuum by first placing the second container at the same height as the first container, exposing both containers to atmospheric pressure, and then filling the unit with mercury until both containers are approximately half full and the mercury is at identical levels in both containers. The balance is then placed in a state of equilibrium and the height of the second container is read on the graduated scale. To measure the low pressure or partial vacuum, the mercury in the second container is exposed thereto, thereby causing the displacement of the mercury between the two containers and a consequent tilting of the balance. The second container is then displaced along the length of the graduated scale until the equilibrium of the balance is restored at which time the level of the mercury in the first container will have been restored to its original height. The new height of the second container is then read on the graduated scale. The difference between the two readings in the height of the second container will give, in millimeters of mercury, the pressure or partial vacuum which has been measured.

By housing the first container in an enclosed area which can be exposed both to the atmosphere and to one of two different pressures, it is possible by means of the aforesaid essential construction to measure the difference between these two pressures. In this use of the apparatus, after it has been initially prepared as aforesaid, the lower of the two pressures is applied to the enclosed area, while the other pressure is applied to the mercury level in the second container. When the equilibrium of the balance is restored and the reading of the graduated scale taken, the difference in the two heights of the second container will give in millimeters of mercury the differential pressure measured.

It has been found that the manometer embodying the invention is extremely accurate, to about 0.5 thousandths, since readings of liquid levels which are difficult to perform with accuracy, are replaced by measurements of height on a graduated scale, and by measurements of a balance which can be made extremely accurate by the use of a high precision balance provided with a measuring vernier.

Figure 2:
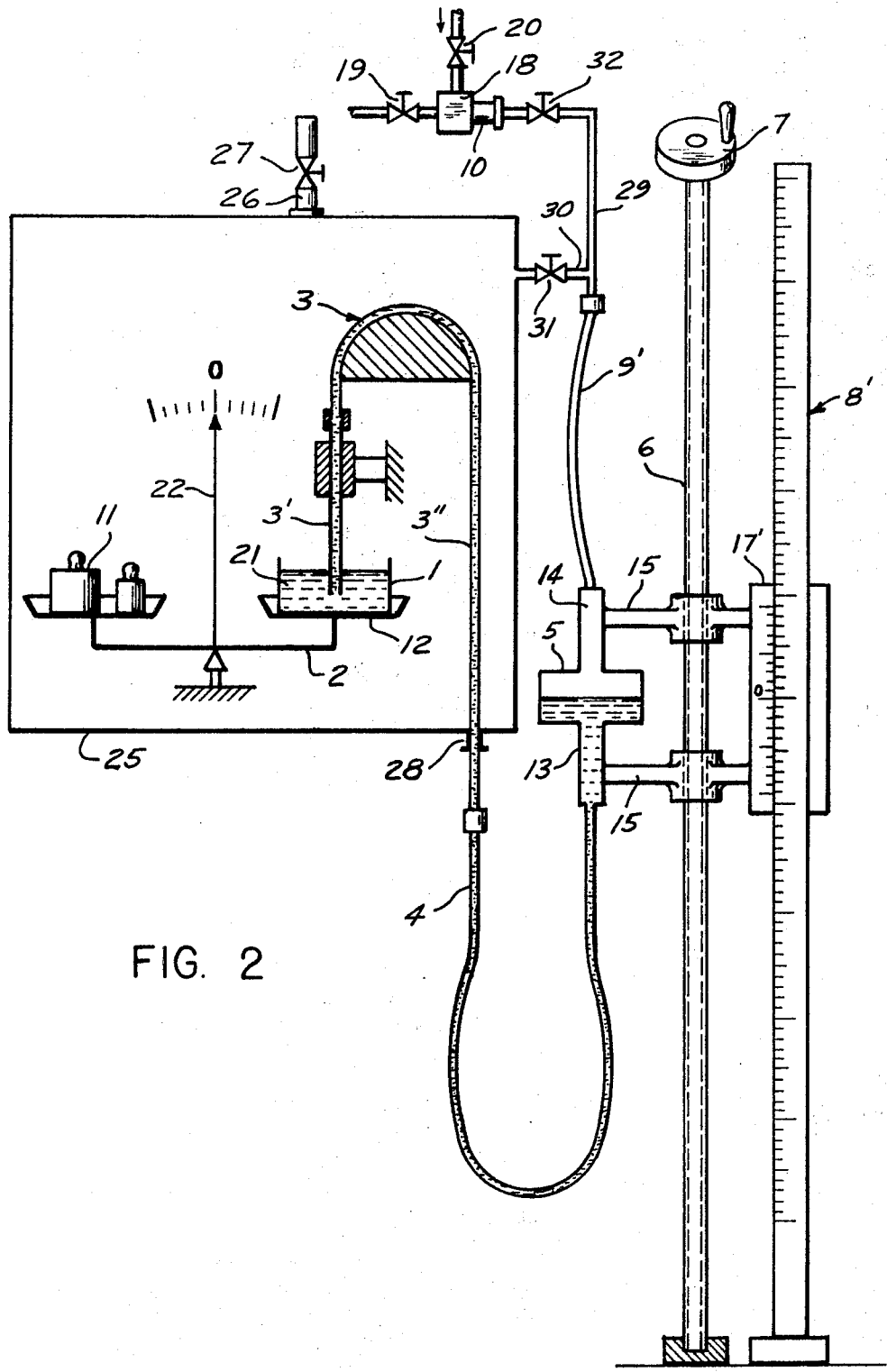

It is believed that characteristics and advantages of the manometer of this invention will be better understood from a consideration of the following description when read in connection with the accompanying drawings, in which FIG. 1 is is an elevational schematic view of one form in which the apparatus may be constructed to measure a pressure differing from the atmosphere; and FIG. 2 is a similar view showing how the apparatus may be utilized to measure differential pressure.

In both figures of the drawings, similar reference numerals have been applied to parts which are the same, or substantially the same in both constructions. Referring now more particularly to FIG. 1 of the drawings, the container which has heretofore been referred to as the "first container" is generally designated 1, and the other container which has heretofore been referred to as the "second container" is generally designated 5. The container 1 is seated on the tray 12 of a balance 2 of any suitable construction. Inserted into the open mouth of the container 1 and extending down into such container to a point short of the bottom of the latter, is a vertical end portion 3' of a rigid pipe 3 having a U-shaped upper end. The other leg 3" of the pipe 3 extends downwardly substantially below the container 1 to and is connected to the lower end of a flexible pipe 4 which has a practically constant volume no matter what its position or condition. In the form shown in FIG. 1 the flexible pipe 4 is spring shaped so that its upper end may be moved relative to its lower end without change in its volume. The upper end of the flexible pipe 4 is connected to the bottom end of the container 5. It will be noted that the container 5 is constructed to have reduced lower and upper end portions 13 and 14, respectively, and an enlarged central portion in which is located the mercury level. The container 5 is supported by two arms 15 which are connected at their inner ends to the reduced end portions 13 and 14 of such container and which are both threadedly connected intermediate their ends to a threaded vertical rod 6 provided at its upper end with a manually operable handle 7. The outer ends of the two arms 15 are slidably connected to a vertical guide bar 16. The enlarged central portion of container 5 carries a vernier 17 arranged to slide along the divisions or graduations on the main vernier scale 8. It will thus be seen that by manipulating the handle 7, the height of the second container 5 may be varied, and such height may be read accurately on the vernier scale 8. The graduations on the scale 8 are in millimeters of mercury and extend sufficiently both above and below the first container 1 to take care of the range of movements of the second container 5 in measuring the range of pressures for which the apparatus was designed.

The upper end of the container portion 14 is connected through a spirally-shaped flexible pipe 9 to a nozzle 10 provided on the lower end of a chamber 18 connected through a valve 19 to the atmosphere and through a valve 20 to the source of pressure which is to be measured. When the valve 20 is closed and valve 19 opened, the container 5 through the chamber 18, nozzle 10 and pipe 9, is exposed to atmospheric pressure. In this condition of such parts, the container 5 is raised to the level of container 1 in order to receive the supply of mercury 21 which is to be contained in container 1, pipe 3, pipe 4 and container 5. The mercury is added until the levels thereof in the two containers 1 and 5 reach the mid-heights thereof which are identical. The balance 2 is then placed in equilibrium by means of the weights 11 in which condition thereof the printer 22 of the balance will be at 0 position. The height of the container 5 is then taken on the graduated scale 8.

After the apparatus has been prepared in the manner above described, the valve 19 is closed and the valve 20 opened to expose the mercury in container 5 to the low pressure or partial vacuum which it is desired to measure. When the mercury in container 5 is so exposed to the pressure to be measured, there is caused a variation in the levels of mercury in both containers 5 and 1. As the volume of mercury in container 1 changes, the balance 2 will become unbalanced. In order to restore the equilibrium of the balance, the container 5 is moved vertically in a direction to attain this result. As this is done, the original quantity of mercury 21 in container 1 will be restored. Consequently, the levels of mercury in both containers 1 and 5 will return to their exact original positions therein. When the equilibrium of the balance is restored by so changing the height of container 5, the new height of such container is read on the graduated scale 8. The difference between this reading and the original reading for the container will give in millimeters of mercury, an exceedingly accurate measurement of the pressure to which the container 5 is connected through valve 20.

In the aforesaid practice of the invention, it should be noted that the volumes of the containers above and below the levels of mercury established therein during the supply of such mercury at atmospheric pressure, must be sufficient to take care of the variations in volume of the mercury displaced between the two containers at the maximum and minimum of the range of pressure which the apparatus is designed to measure. Further, the cross-sectional area of container 1 should be sufficiently large so that errors in the weight of mercury which occur due to the inaccuracy of the balance 2, will result only in variations in the mercury level in this container that are within the degree of measured accuracy required. The cross-sectional area of the enlarged portion of container 5 in which the mercury level is located should be sufficiently large so that any variation in the volume of the flexible pipe 4 because of its deformation due to the displacement of the container 5, will only produce a negligible variation of the mercury level in such container. Also such cross-sectional area of the enlarged portion of container 5 should be sufficient to effect the transfer into container 1 of a measurable quantity of mercury with the required degree of accuracy, when the height of container 5 is varied.

Considering now the embodiment shown in FIG. 2 of the drawings, it will be noted that the balance 2, container 1, and the U-shaped upper end of rigid pipe 3 are contained within an enclosed area or chamber 25 which may be connected by means of a pipe 26 and valve 27 to the source of the lower of two pressures whose difference is to be measured. The leg 3" of the rigid pipe 3 leaves the enclosed area 5 through a seal 28. The chamber 25 should be sized and constructed to resist those pressures to which it is subjected.

Instead of the container 5 carrying a vernier 17 and being controlled in its movements by a guide bar 16 and guide members provided on the outer ends of its supporting arms 15,15 as in the embodiment of FIG. 1, in the embodiment of FIG. 2 the vernier scale 8' performs a dual function. That is, the vernier 17' is mounted on the outer ends of the arms 15,15 and is constructed in the form of a slide so that the scale 8' functions both as the main graduated scale and a guide post. The vernier scale 8' and the threaded rod 6 and handle 7, however, perform the same functions as the vernier scale 8, threaded rod 6, handle 7 and post 16 in the embodiment of FIG. 1. The lower part of container 5 is connected by means of a flexible pipe 4 in the form of a supple tube to the lower end of the leg 3" of the rigid tube 3. The upper part of container 5 is connected by means of a flexible pipe 9' to a pipe section 29 which is connected by a pipe 30 and valve or tap 31 to the chamber 25. The pipe section 29 is also connected by a valve or tap 32 to a nozzle 10 provided on a chamber 18 which is connected by a valve or tap 19 to the atmosphere and by a valve or tap 20 to the source of the higher of the two pressures whose difference is to be measured.

In preparing the apparatus of FIG. 2 for operation, tap 27 is closed, taps 31 and 32 are opened, and tap 20 is closed and tap 19 opened so that both the chamber 25 and the two containers 1 and 5 are exposed to atmospheric pressure. Then in the manner described with respect to the embodiment of FIG. 1, the container 5 is placed at the same level as container 1, the whole unit constituted of the container 5, pipe 4, pipe 3 and container 1 is filled with mercury 21 up to approximately midheight of the two containers so that the two mercury levels are identical, the balance is placed in a position of equilibrium by weights 11 so that the scale index 22 is at position 0, and then the height of container 5 is read from the graduated scale 8'.

In measuring the differential pressure, tap 32 is closed while leaving tap 31 open so that the enclosed area 25 remains in contact with container 5 through the flexible pipe 9'. Tap 27 is then opened to expose the enclosed area 25 to the lower of the two pressures whose difference is to be measured, this pressure acting equally on the mercury levels in the containers 1 and 5. A check is made to ensure that the balance 2 remains in equilibrium and that there is no leak or fault in the apparatus which might lead to incorrect measurements. The tap 31 is then closed to isolate the container 5 from the enclosed area 25. Tap 19 is closed and tap 20 opened to bring the chamber 18 into communication with the higher of the two pressures being measured. Tap 17 is then opened to permit the higher pressure to exert its force on the mercury level in container 5. This increased pressure on such mercury level has the effect of displacing a certain quantity of mercury into container 1 and, consequently, of disturbing the equilibrium of the balance 2. Container 5 is then displaced to restore the balance 2 to its position of equilibrium and so that the level of mercury in container 1 regains its original position. The new height of the container 5 is then read from the graduated scale 8'. The difference between the two heights of the container 5 will give, in millimeters of mercury, the differential pressure measured.

I claim:

1. A high precision mercury manometer comprising a first container holding mercury at a given level under atmospheric pressure, means for balancing said container with the mercury therein at said given level, a second container holding mercury, means supporting said second container for vertical movement, tubular means connecting said first container to said second container comprising an end portion of a rigid pipe inserted vertically down into the mercury in said first container, and a flexible portion between said rigid pipe and said second container, said tubular means being connected to the bottom of said second container, being filled with mercury and having a practically constant volume regardless of the deformation thereof caused by changes in position of said second container, means for exposing the mercury in said second container to atmospheric pressure, or to a second pressure, the level of the mercury in said second container under atmospheric pressure being at the same height as the mercury level in the first container when the two containers are at the same height, and changing to a different height when exposed to said second pressure to change the quantity of mercury in said first container and to unbalance said balancing means, said supporting means being operable to move said second container to another position at which said balancing means is restored to balance while the mercury in such container is being subjected to such second pressure, and means for measuring the different heights of the second container.

2. A mercury manometer as defined in claim 1, in which said second container has an enlarged central portion in which the mercury level is located, and reduced upper and lower end portions, and in which said tubular means is connected to said reduced lower end portion, and in which said pressure exposing means is connected to the reduced upper end portion of said second container and comprises fixed pressure supplying means and flexible tubular means between said fixed means and said reduced upper end portion.

3. A mercury manometer as defined in claim 2, in which said supporting means comprises a micrometer adjusting device having a vertically movable element, and means for supporting said second container on said movable element.

4. A mercury manometer as defined in claim 2, in which said measuring means comprises a vertically disposed main scale having graduations in millimeters of mercury extending both above and below the level of said first container, and a vernier coacting with said main scale and connected to said second container for movement therewith.

5. A mercury manometer as defined in claim 1, including a sealed chamber containing said first container, said balancing means, and a portion at least of said rigid pipe, second means for exposing said chamber either to atmospheric pressure, or to a third pressure whose difference with said second pressure is to be measured, and means for bringing a pressure in said sealed chamber into communication with said second container to expose the mercury level therein to such pressure.

6. A mercury manometer as defined in claim 5, in which said first mentioned pressure exposing means comprises fixed pressure supplying means and flexible tubular means between said fixed means and said second container, and in which said means for bringing a pressure in the sealed chamber into communication with said second container comprises second tubular means connecting said sealed chamber with said first pressure supplying means, and means for controlling the application of pressure from either said sealed chamber, or said first mentioned pressure exposing means to the mercury level in said second container.

7. The method of measuring a pressure or partial vacuum which comprises taking a unit composed of two mercury reservoirs connected by partially flexible tubing one end of which extends down into one of such reservoirs and the other end of which is connected to the bottom of the other reservoir, placing the two reservoirs at the same height while exposing them to atmospheric pressure, then filling the unit with mercury until both reservoirs are approximately half full and the mercury is at identical levels in both reservoirs, then balancing the one reservoir and taking the height of the other reservoir in millimeters of mercury, then exposing the mercury level in the other reservoir to a second pressure to be measured thereby causing a displacement of mercury between the two reservoirs and an unbalancing of the balance, displacing the other reservoir in a direction to restore the balance to balanced condition, then taking the new height of the other reservoir in millimeters of mercury, and finally taking the difference between the two heights of the other reservoir in millimeters of mercury.

8. The method defined in claim 7, including the steps of exposing the mercury in both reservoirs to a third pressure after it has been exposed to atmospheric pressure and while the mercury levels in both reservoirs are at identical heights and the one reservoir is balanced, and then while maintaining the mercury level in said one reservoir exposed to the third pressure, exposing the mercury level in the other reservoir to said second pressure to cause said displacement of mercury between the two reservoirs.

* * * * *